April 3, 1962 R. N. CLOSE 3,028,504

FEEDBACK AMPLIFIER TYPE DETECTOR CIRCUIT

Filed April 15, 1958 4 Sheets-Sheet 1

INVENTOR.
RICHARD N. CLOSE
BY Wade Koontz
ATTORNEY and
Richard J. Killoren
AGENT

FEEDBACK AMPLIFIER TYPE DETECTOR CIRCUIT

Filed April 15, 1958 4 Sheets-Sheet 2

INVENTOR.
RICHARD N. CLOSE
BY Wade Koontz
ATTORNEY
Richard J Killoren
AGENT

INVENTOR.
RICHARD N. CLOSE
BY Wade Koontz
ATTORNEY
Richard J. Killoren
AGENT

INVENTOR.
RICHARD N. CLOSE
BY Wade Koontz
ATTORNEY
Richard J. Killoren and
AGENT

United States Patent Office 3,028,504

Patented Apr. 3, 1962

3,028,504

FEEDBACK AMPLIFIER TYPE DETECTOR CIRCUIT

Richard N. Close, Garden City, N.Y., assignor to the United States of America as represented by the Secretary of the Air Force Filed Apr. 15, 1958, Ser. No. 728,753
9 Claims. (Cl. 307—33)

This invention relates to a feedback amplifier type detector circuit for demodulating the two outputs of a resolver to provide voltages proportional to the sine and cosine of the resolver shaft angle.

One object of the invention is to provide a circuit for demodulating the two outputs of a resolver which provides high accuracy by eliminating the effects of rectifier contact potential, filter lag and reference voltage unbalance.

This and other objects will be more fully understood from the following detailed description taken with the drawing wherein.

The detector circuit of the invention is a precision peak-detector operating in conjunction with an integrating amplifier. The detector is turned on at the positive peaks of the reference voltage by an electronic switch. The output voltage of the integrating amplifier is continuously compared with the output voltage of the resolver and the difference between the two voltages is applied to an error amplifier. The amplified voltage difference between these two voltages produces a correction current which is applied to the integrator during the positive peaks, through the electronic switch, to change the output of the integrator so as to correct for the unbalance at the input of the comparator.

Figure 1:
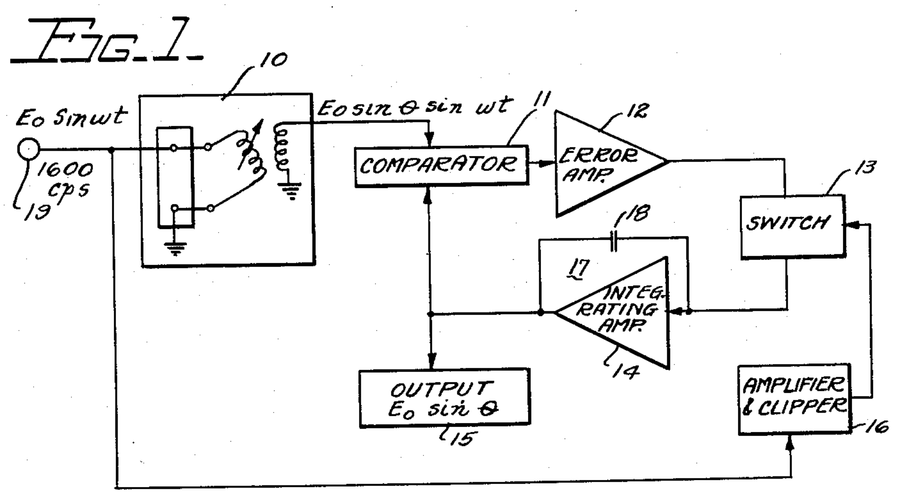
FIG. 1 is a block diagram of a detector circuit according to the invention.

Since the sine and cosine circuits are identical only the sine circuit is illustrated in FIG. 1.

Figure 5:
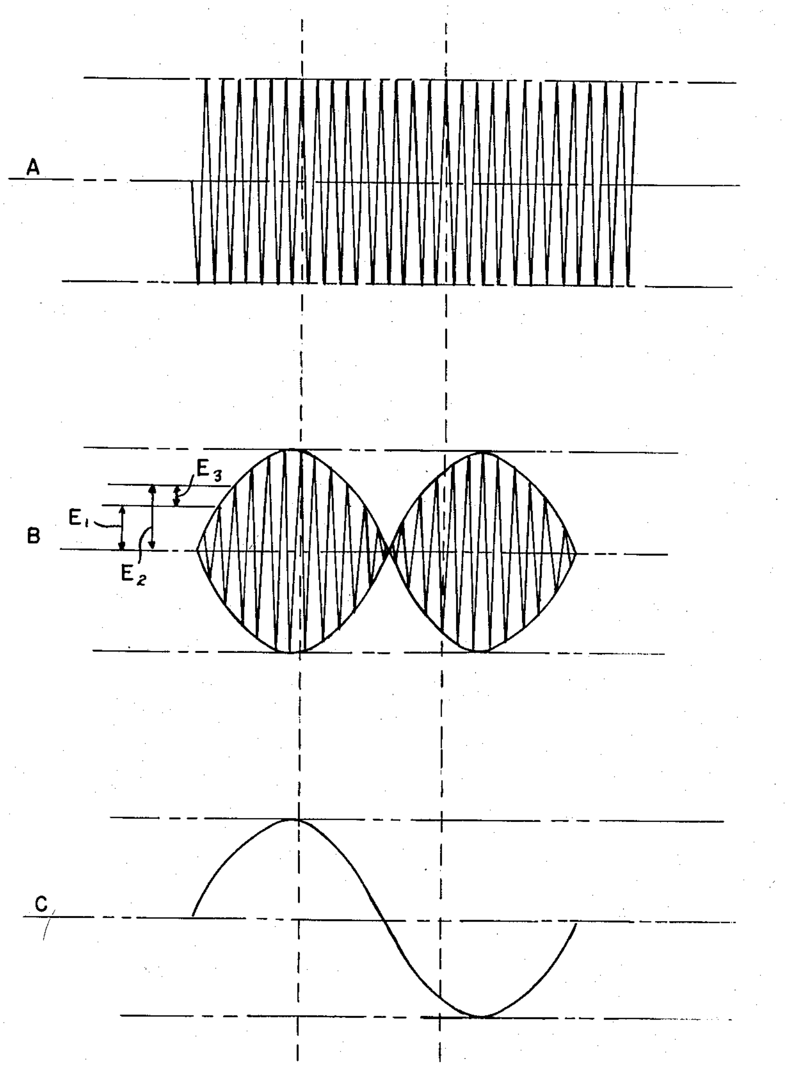
FIG. 5 shows waveforms at various points in the circuit.

Referring now to FIG. 1 of the drawing, reference numeral 11 refers to the comparator wherein the output of the integrating amplifier 14 is continuously compared with the input from the resolver 10 and the difference between the two voltages is applied to an error amplifier 12. The amplified difference voltage is applied to integrator 17 through a switch 13. The 1600 cycle rotation frequency, signal from source 19 shown in waveform A in FIG. 5 is applied to switch 13 through amplifier and clipper circuit 16 so that the switch is closed for the duration of the positive peaks or maxima of said signal. The output volttage of integrator 17 is therefore made to follow the envelope of the modulated 1600 c.p.s. rotation voltage shown in waveform C in FIG. 5. At the end of each pulse peak the switch 13 is opened and the integrator 17 retains its charge until the next pulse peak from amplifier and clipper 16 operates switch 13. The output voltage from integrator 17 is also fed to the output sine circuit 15.

Figure 2:
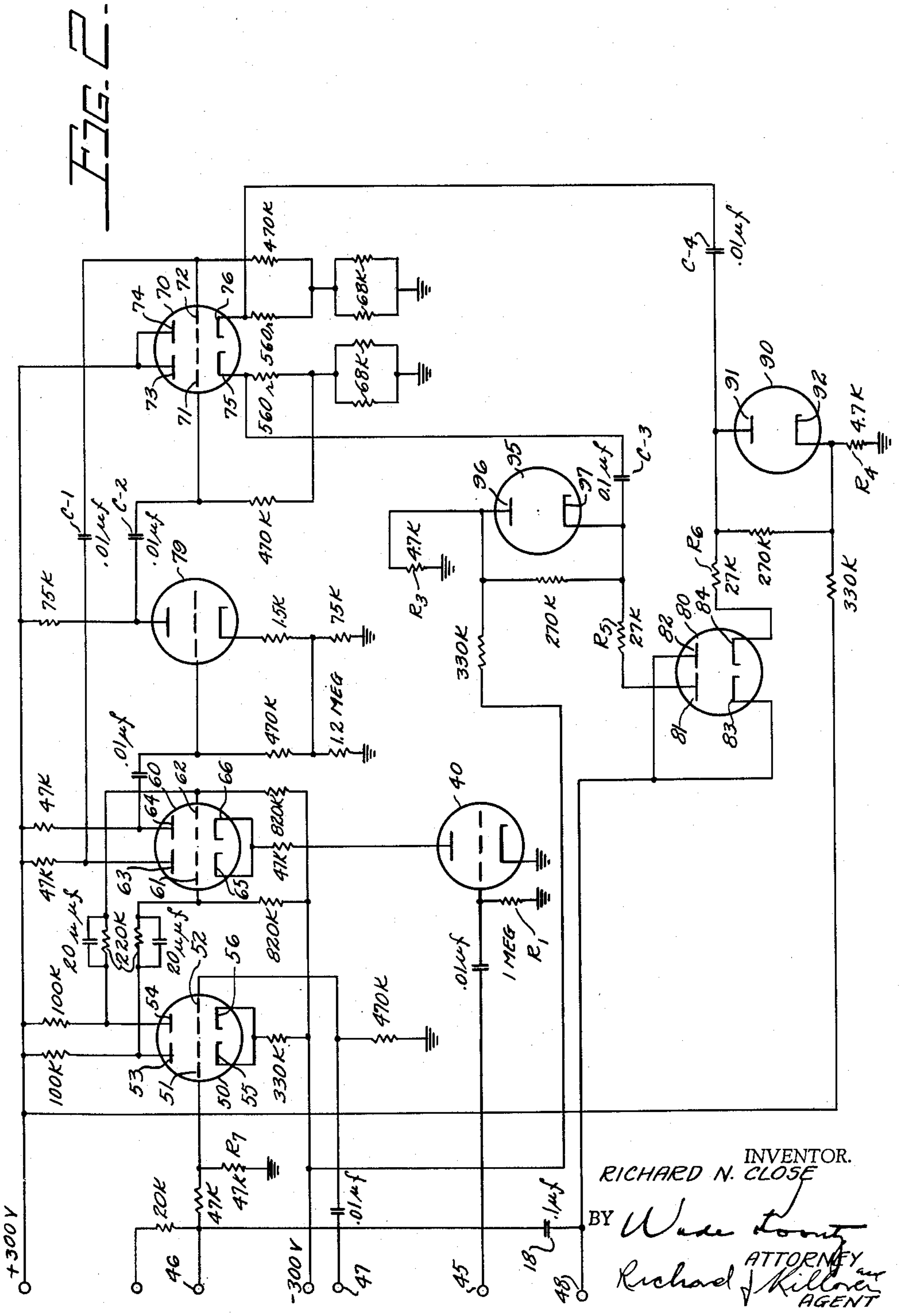
FIG. 2 is a circuit schematic for the detector circuit of FIG. 1.

A more complete description of the detector circuit will be given with respect to FIG. 2. The amplified and clipped 1600 cycle reference voltage from 16 is applied at terminal 45 to the grid of gating tube 40. This tube is normally cut off, except at the positive peaks of the reference voltage, by grid leak bias developed across resistor $R_1$. When gating tube 40 conducts, current flows in the differential amplifier 60 and produces two negative pulses one at each of the plates of this tube. The amplitude difference of these two negative pulses is dependent upon the degree of unbalance of the voltages on grids 61 and 62. The negative pulse on plate 63 is applied to the grid 72 of cathode follower 70 through the coupling capacitor C–1. The pulse on plate 64 of tube 60 is phase inverted in the unity-gain phase inverter 79 and is applied to grid 71 of tube 70 through coupling condenser C–2. The amplitude difference of the pulses applied to tube 70 is dependent upon the unbalance of the voltages on the grids of tube 60 which in turn is dependent upon the unbalance of the voltages on the grids of tube 50. The only voltages of interest on tube 50 are those occurring during the positive peaks of the 1600 c.p.s. reference voltage since tube 60 is cut off at all other times. The signal applied to grid 51 of tube 50 from terminal 46 is the output signal of the integrator circuit 17 and the signal applied to grid 52 from terminal 47 is the output signal from resolver 10. If, at the time of one of the positive peaks, the output of the integrator is $E_1$ as shown in FIG. 5 and the output from the resolver is $E_2$ a correction $E_3$ will be needed to make the output of the integrator equal to the resolver output. Thus, the amplitude difference of the pulses applied to tube 70 would equal $E_3$. The amplitude of $E_3$ is greatly exaggerated. The outputs of cathode follower 70 are applied through capacitors C–3 and C–4 to the plate 81 and cathode 84 of the double diode 80 which is normally cut off by a bias developed across resistors $R_3$ and $R_4$. For the duration of the pulses, tube 80 conducts current through resistors $R_5$ and $R_6$. If the positive current through resistor $R_5$ does not exactly cancel the negative current through resistor $R_6$, a resultant current flows into the input of the integrating amplifier which is connected across integrating capacitor 18. The current, therefore, that is fed into the integrating capacitor 18 is of the correct polarity to change the output of the integrating amplifier to correct for the unbalance in the input voltages. The voltages across resistor $R_7$ therefore tends to follow the voltage applied to the grid 52 for the duration of the pulse. At the end of the pulse, tube 60 is cut off, the cathode followers return to normal operating voltages, and capacitors C–3 and C–4 discharge through diodes 90 and 95. Double diode 80 opens and the integrating amplifier retains its charge until the next pulse is received from the amplifier and clipper circuit 16.

Figure 4:
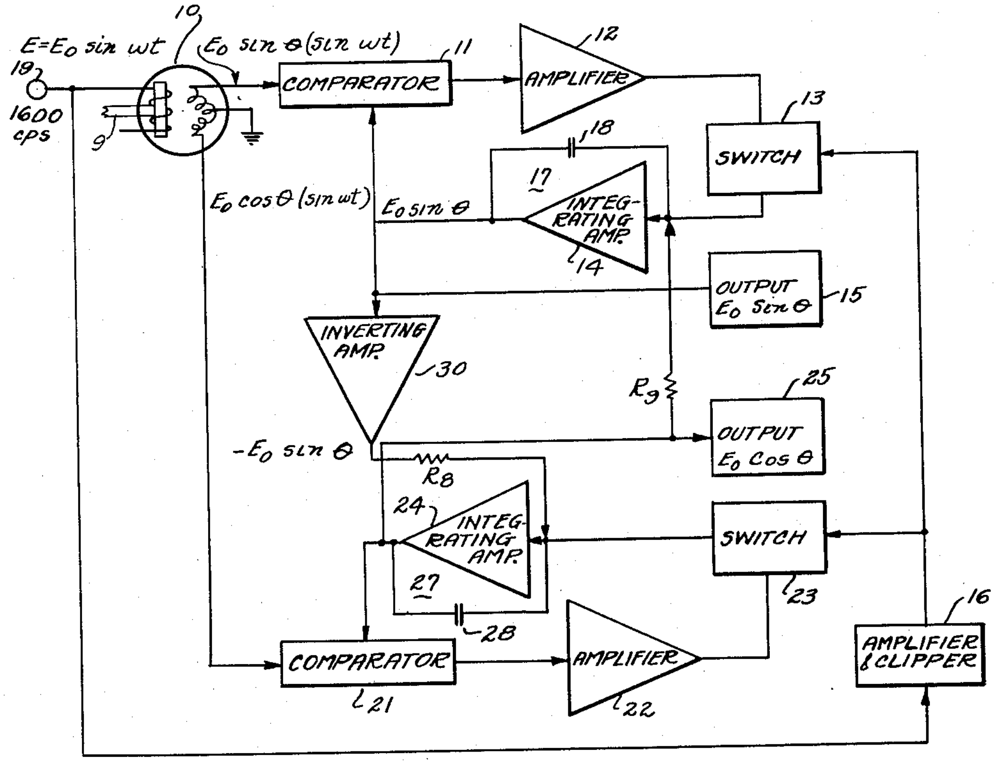
FIG. 4 is a block diagram of a preferred embodiment for the detector circuit of the invention.
Figure 3:
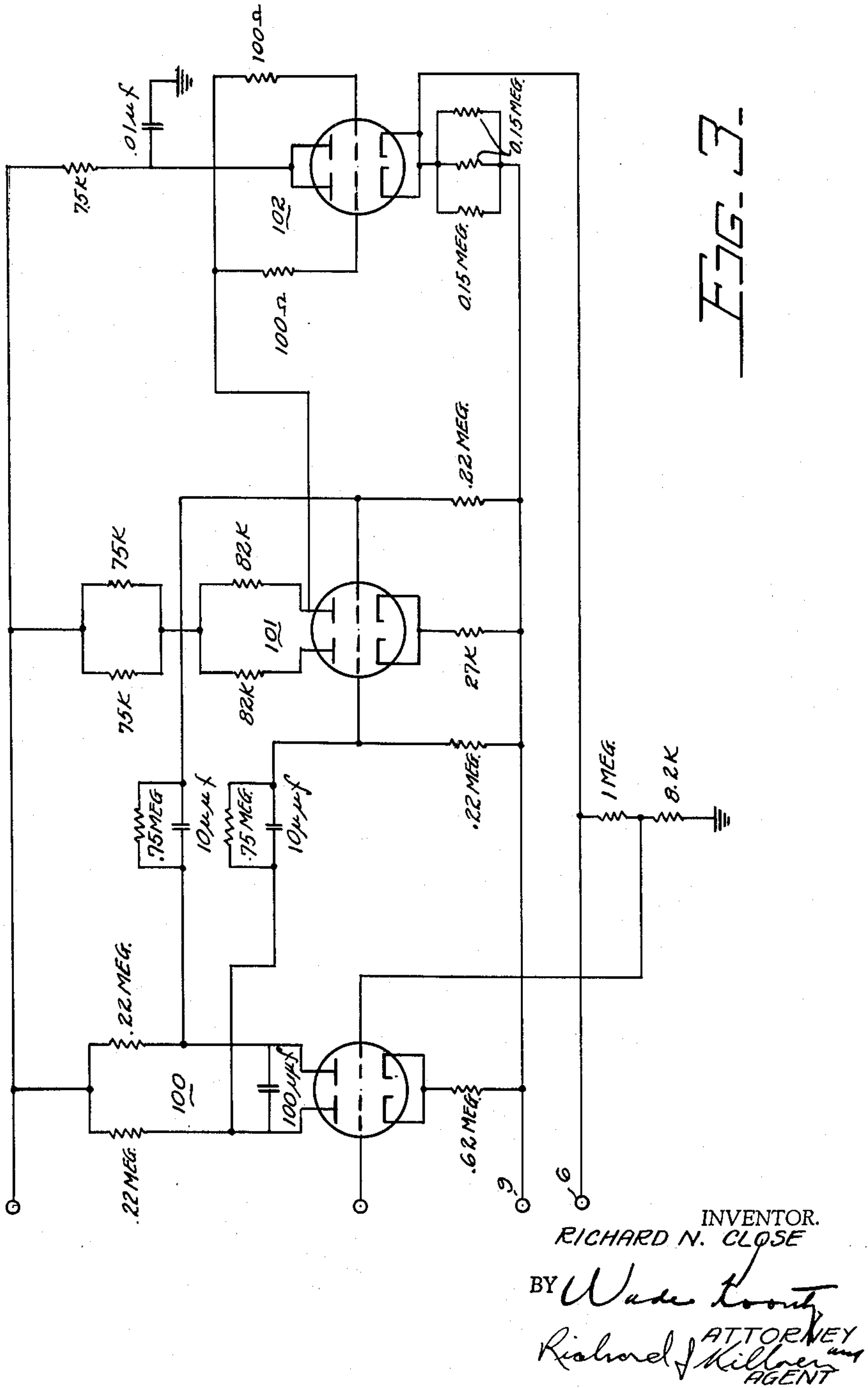
FIG. 3 is a circuit schematic for the integrating amplifier of FIG. 1.

The integrating amplifier 14 connected across the condenser 18 is a high gain amplifier. This amplifier may be any high gain amplifier which satisfies the conditions for use in the Miller type integrating amplifier circuit. One such amplifier is shown in FIG. 3 wherein two differential amplifiers 100 and 101 are followed by a cathode follower 102. Degenerative feedback is applied from the output of the cathode follower 102 to the input through the integrating capacitor 18. The output voltage of the integrating amplifier is proportional to the charge on the integrating capacitor. The output voltage is changed by introducing a charge into the input of the integrating amplifier.

Where a changing A.C. voltage is being detected, stair step jumps will appear in the output. The circuit of FIG. 4 shows how these may be virtually eliminated where the A.C. voltage being followed are sine and cosine outputs of a resolver being rotated at a constant speed by means of a rotating shaft 9. In this case the correction except for errors resulting from circuit imperfections or variations in resolver shaft rotation speed are caused by the change in amplitude of the modulator supply voltage. Therefore, since each integrator output is the derivative of the other in the case of sine and cosine voltages (with one polarity inversion necessary) they may be coupled through resistors to the opposite integrator input and be integrated to regenerate continuously the desired output waves without the need for a correction pulse from the feedback loop for this purpose. The correction loops then need only eliminate the small errors resulting from circuit imperfections and varitations in resolver shaft rotation speed.

Referring now to FIG. 4, elements corresponding with those of FIG. 1 have been given like reference characters. The cosine circuit has a comparator 21, error amplifier 22, switch 23, integrating circuit 27 and output circuit 25 which correspond to like elements in the sine circuit. The output of the integrating circuit 17 is fed to the input of integrating circuit 27 through an inverting amplifier 30 and a resistor $R_8$ and the output of integrating circuit 27 is fed to the input of the integrating circuit 17 through resistor $R_9$. The output voltage from integrator 17 is also fed to the output sine circuit 15. This arrangement essentially constitutes a phase shift oscillator having an oscillating frequency equal to the frequency of the rotation of the resolver shaft.

There is thus provided a feedback amplifier type detector circuit for demodulating the two outputs of a resolver to provide voltages proportional to the sine and cosine of the resolver shaft angle which provides greater accuracy by eliminating some of the faults of prior art circuits which use rectifiers and filters.

Though one specific embodiment has been described in some detail, it is obvious that numerous changes may be made without departing from the general principles and scope of the invention.

I claim:

1. A detector circuit, comprising; a periodic wave source, means for modulating the wave from said source with an information carrying signal, an integrator, means for comparing the output of said modulating means with the output of said integrator to thereby produce an error signal, means responsive to the maxima of said periodic wave for applying said error signal to said integrator only during the time of said maxima of said wave and an output connected to the output of said integrator.

2. A detector circuit, comprising; an A.C. reference signal source, a rotating shaft, means coupled to said shaft for modulating the signal from said reference signal source to produce signals proportional to the sine and cosine of the rotation angle of said shaft, an integrating amplifier, means for comparing one of the outputs of said modulating means with the output of said integrating amplifier to thereby produce an error signal, means responsive to the positive peaks of said reference signal for applying said error signal to said integrating amplifier only during the time of said positive peaks and an output means connected to the output of said integrating amplifier.

3. A detector circuit, comprising; an A.C. reference signal source, a rotating shaft, means coupled to said shaft for modulating the signal from said reference signal source to produce signals proportional to the sine and cosine of the shaft rotation angle, an integrating amplifier, means for comparing one of the outputs of said modulating means with the output of said integrating amplifier to thereby produce an error signal, an electronic switch connected between said comparing means and said integrating amplifier, means for applying said reference signal to said electronic switch whereby said error signal is applied to said integrating amplifier only during the time of the positive peaks of the reference signal and an output circuit connected to the output of said integrating amplifier.

4. A sine-cosine detector, comprising; an A.C. reference signal source, a rotating shaft, means coupled to said shaft for modulating the signal from said reference signal source in accordance with the sine and cosine of the shaft rotation angle, a first integrating amplifier, means for comparing the output of said integrating amplifier with the output of said modulating means which is proportional to the sine of the shaft rotation angle to thereby produce a first error signal, means responsive to the positive peaks of said reference signal for applying said first error signal to said first integrating amplifier only during the time of said positive peaks, an output circuit connected to the output of said first integrating amplifier, a second integrating amplifier, means for comparing the output of said second integrating amplifier with the output of said modulating means which is proportional to the cosine of the shaft rotation angle to thereby produce a second error signal, means responsive to the positive peaks of said reference signal for applying said second error signal to said second integrating amplifier only during the positive peaks of said reference signal, and an output circuit connected to the output of said second integrating amplifier.

5. A detector circuit, comprising; an A.C. reference signal source, a rotating shaft, means coupled to said shaft for modulating the signal from said reference signal source in accordance with the sine and cosine of the shaft rotation angle, a first integrator, a first means for comparing the output of said first integrator with the sine modulated signal of said modulator to thereby produce a first error signal, a first electronic switch connected between said first comparing means and said first integrator, means for applying said reference signal to said first electronic switch whereby said first error signal is supplied to said first integrator only during the time of the positive peaks of said reference signal, an output circuit connected to the output of said first integrator, a second integrator, a second means for comparing the output of said second integrator with the cosine modulated signal of said modulator to thereby produce a second error signal, a second electronic switch connected between said second comparing means and said second integrator, means for applying said reference signal to said second electronic switch whereby said second error signal is applied to said second integrator only during the time of the positive peaks of said reference signal and an output circuit connected to the output of said second integrator.

6. A sine-cosine detector, comprising; an A.C. reference signal source, a rotating shaft, means coupled to said shaft for modulating the signal from said reference signal source in accordance with the sine and cosine of the shaft rotation angle, a first integrating amplifier, means for comparing the output of said integrating amplifier with the output of said modulating means which is proportional to the sine of the shaft rotation angle to thereby produce a first error signal, means responsive to the positive peaks of said reference signal for applying said first error signal to said first integrating amplifier only during the time of said positive peaks, an output circuit connected to the output of said first integrating amplifier, a second integrating amplifier, means for comparing the output of said second integrating amplifier with the output of said modulating means which is proportional to the cosine of the shaft rotation angle to thereby produce a second error signal, means responsive to the positive peaks of said reference signal for applying said second error signal to said second integrating amplifier only during the positive peaks of said reference signal, an output circuit connected to the output of said second integrating amplifier, means, including a polarity inverting means, for coupling the output of said first integrating amplifier to the input of said second integrating amplifier and means for coupling the output of said second integrating amplifier to the input of said first integrating amplifier.

7. A detector circuit, comprising; an A.C. reference signal source, a rotating shaft, means coupled to said shaft for modulating the signal from said reference signal source in accordance with the sine and cosine of the shaft rotation angle, a first integrator, a first means for comparing the output of said first integrator with the sine modulated signal of said modulator to thereby produce a first error signal, a first electronic switch connected between said first comparing means and said first integrator, means for applying said reference signal to said first electronic switch whereby said first error signal is applied to said first integrator only during the time of the positive peaks of said reference signal, an output circuit connected to the output of said first integrator, a second integrator, a second means for comparing the output of said second integrator with the cosine modulated signal of said modulator to thereby produce a second error signal, a second electronic switch connected between said second comparing means and said second integrator, means for applying said reference signal to said second electronic switch whereby said second error signal is applied to said second integrator only during the time of the positive peaks of said reference signal, an output circuit connected to the output of said second integrator, means, including a polarity inverting means, for coupling the output of said first integrator to the input of said second integrator and means for coupling the output of said second integrator to the input of said first integrator.

8. A sine-cosine detector, comprising; an A.C. reference signal source, a rotating shaft, means coupled to said shaft for modulating the signal from said reference signal source in accordance with the sine and cosine of the shaft rotation angle, a first integrating amplifier, means for comparing the output of said integrating amplifier with the output of said modulating means which is proportional to the sine of the shaft rotation angle to thereby produce a first error signal, means responsive to the positive peaks of said reference signal for applying said first error signal to said first integrating amplifier only during the time of said positive peaks, an output circuit connected to the output of said first integrating amplifier, a second integrating amplifier, means for comparing the output of said second integrating amplifier with the output of said modulating means which is proportional to the cosine of the shaft rotation angle to thereby produce a second error signal, means responsive to the positive peaks of said reference signal for applying said second error signal to said second integrating amplifier only during the positive peaks of said reference signal, an output circuit connected to the output of said second integrating amplifier, means including a coupling resistor for connecting the output of said first integrating amplifier to the input of said second integrating amplifier, a polarity inverting amplifier connected between the output of said first integrating amplifier and said coupling resistor and means including a coupling resistor for connecting the output of said second integrating amplifier to the input of said first integrating amplifier.

9. A detector circuit, comprising; an A.C. reference signal source, a rotating shaft, means coupled to said shaft for modulating the signal from said reference signal source in accordance with the sine and cosine of the shaft rotation angle, a first integrator, a first means for comparing the output of said first integrator with the sine modulated signal of said modulator to thereby produce a first error signal, a first electronic switch connected between said first comparing means and said first integrator, means for applying said reference signal to said first electronic switch whereby said first error signal is applied to said first integrator only during the time of the positive peaks of said reference signal, an output circuit connected to the output of said first integrator, a second integrator, a second means for comparing the output of said second integrator with the cosine modulated signal of said modulator to thereby produce a second error signal, a second electronic switch connected between said second comparing means and said second integrator, means for applying said reference signal to said second electronic switch whereby said second error signal is applied to said second integrator only during the time of the positive peaks of said reference signal, an output circuit connected to the output of said second integrator, means, including a coupling resistor, for connecting the output of said first integrator to the input of said second integrator, a polarity inverting amplifier connected between the output of said first integrator and said coupling resistor and means, including a coupling resistor, for connecting the output of said second integrator to the input of said first integrator.

References Cited in the file of this patent

UNITED STATES PATENTS 2,713,143 Bock ---------------- July 12, 1955